US010769433B2

(12) United States Patent
Nowak et al.

(10) Patent No.: US 10,769,433 B2
(45) Date of Patent: Sep. 8, 2020

(54) METHOD FOR BIOMETRIC BASED SIGNING OF DOCUMENT

(71) Applicant: MasterCard International Incorporated, Purchase, NY (US)

(72) Inventors: Dawid Nowak, Dublin (IE); John Allen, Wicklow (IE)

(73) Assignee: Mastercard International Incorporated, Purchase, NY (US)

( * ) Notice: Subject to any disclaimer, the term of this patent is extended or adjusted under 35 U.S.C. 154(b) by 200 days.

(21) Appl. No.: 15/796,017

(22) Filed: Oct. 27, 2017

(65) Prior Publication Data
US 2018/0137354 A1 May 17, 2018

(30) Foreign Application Priority Data

Nov. 14, 2016 (EP) .................................. 161986039

(51) Int. Cl.
*G06F 21/32* (2013.01)
*G06K 9/00* (2006.01)
*G06Q 10/10* (2012.01)
*G06F 3/01* (2006.01)

(52) U.S. Cl.
CPC ......... *G06K 9/00577* (2013.01); *G06F 3/013* (2013.01); *G06F 21/32* (2013.01); *G06K 9/00892* (2013.01); *G06Q 10/10* (2013.01); *G06K 2009/00395* (2013.01)

(58) Field of Classification Search
CPC .......... G06K 9/00577; G06K 9/00892; G06K 2009/00395; G06F 3/013; G06F 21/32; G06Q 10/10

USPC .......................................................... 713/176
See application file for complete search history.

(56) References Cited

U.S. PATENT DOCUMENTS

| 2005/0033813 | A1* | 2/2005 | Bhogal | G06Q 40/00 709/206 |
| 2005/0216742 | A1 | 9/2005 | Wong et al. | |
| 2005/0235203 | A1* | 10/2005 | Undasan | G06F 3/0481 715/205 |
| 2005/0288954 | A1* | 12/2005 | McCarthy | A61B 5/6815 705/2 |

(Continued)

FOREIGN PATENT DOCUMENTS

AU        2015297036 B2 *  9/2017  ............. G06F 21/64

OTHER PUBLICATIONS

"PCT Search Report and Written Opinion", International Searching Authority, dated Dec. 20, 2017 (Dec. 20, 2017), for International Application No. PCT/US2017/058443, 10pgs.

(Continued)

*Primary Examiner* — Eleni A Shiferaw
*Assistant Examiner* — Sakinah White Taylor
(74) *Attorney, Agent, or Firm* — Buckley, Maschoff & Talwalkar LLC

(57) ABSTRACT

A method for biometry based signing of documents. In an embodiment, the method includes receiving, on a terminal, a signature request associated to a document from a requester, and displaying the document to the user on the user terminal. The process also includes requesting at least once a biometric identification of the user to create at least one signing receipt, associating the signing receipt to the document, and transmitting the document and/or the signing receipt from the user terminal to the requester.

12 Claims, 4 Drawing Sheets

(56) References Cited

U.S. PATENT DOCUMENTS

| | | | | |
|---|---|---|---|---|
| 2010/0161993 | A1* | 6/2010 | Mayer | G06F 21/64 |
| | | | | 713/178 |
| 2010/0325698 | A1* | 12/2010 | Ginter | H04N 21/25875 |
| | | | | 726/4 |
| 2011/0093807 | A1* | 4/2011 | Dunn | G06F 40/174 |
| | | | | 715/780 |
| 2011/0213700 | A1* | 9/2011 | Sant'Anselmo | G06Q 20/10 |
| | | | | 705/39 |
| 2013/0307670 | A1* | 11/2013 | Ramaci | G06F 21/6245 |
| | | | | 340/5.82 |
| 2015/0135332 | A1 | 5/2015 | Follis et al. | |
| 2015/0163206 | A1 | 6/2015 | McCarthy et al. | |

OTHER PUBLICATIONS

"Communication: European Search Report", European Patent Office, dated May 26, 2017, for European Application No. 16198603.9-1853, 6pgs.

* cited by examiner

METHOD FOR BIOMETRIC BASED SIGNING OF DOCUMENT

CROSS-REFERENCE TO RELATED APPLICATION

This application is a U.S. National Stage filing under 35 U.S.C. § 119, based on and claiming benefits of and priority to European Patent Application No. 16198603.9 filed on Nov. 14, 2016. The entire disclosure of the above application is incorporated herein by reference.

TECHNICAL FIELD

The present disclosure relates to the field of biometrics. More particularly, the present disclosure relates to a method for biometric based signing of electronic documents. Moreover, the disclosure relates to a computer program product and a computer readable medium. The computer readable medium comprises computer-executable instructions, which, when executed by the respective device(s) being equipped with processors causing the device(s) to perform the method steps of the disclosure on the respective device.

BACKGROUND

Biometric authentication has become a valuable tool. This is because of the comprehensive availability of suitable scanning devices, e.g. in form of smart phones providing scanning functionality, and also because of improved network connectivity. Existing hardware, biometric authentication methods can be implemented in many situations, such as authentication, identification and also authorization processes. In addition, partially because of the same reasons, electronic documents are more and more substituting conventional paper documents. This is in the field of communication, e.g. emails and documents send via email, but also many processes conventionally making use of paper documents are transferred to electronic documents, e.g. acknowledgements of receipt of mail or email deliveries or electronic files used in modern offices.

While the protection of electronic documents as such, e.g. pdf-protection settings or (server side) email protection settings are highly evolved and assist to increase security in the world of electronic documents and communication, the possibilities for electronic signing are rather limited. In the context of conventional mail delivery, the signature of the recipient is prompted on an electronic device. Modern email settings allow to request an acknowledgement of receipt from the recipient. However, both examples do not include any (automatic) authentication functionality and the identity of the recipient has to be verified manually. Furthermore, even if the document has been delivered correctly, there is no indication whether the recipient has read the document.

Similar problems arise in the context of the acknowledgement of the content of electronic documents. Electronic documents, such as e.g. contracts (e.g. software license agreements) require approval ("signing") by the user. This is often implemented as a klick-box at the end of the electronic document, where the user confirms that he has read the document and that he agrees with its content. However, due to the length of these contracts, the requested confirmation is often given, even though the document has not been read. This may result in further problems. For example, if a contract contains an unusual clause, the contract may be invalid, as the user could argue that this was unexpected— even though he has not read the entire document but just signed it at the end of the document.

Accordingly, there is a need to enhance the possibilities of electronic signing of electronic document in order overcome the limitations, e.g. the limitation with respect to recipient authentication and with respect to content acknowledgement.

SUMMARY OF THE INVENTION

The present disclosure provides one or more solutions to the problems and disadvantages of the background art. Other technical advantages of the present disclosure will be readily apparent to one skilled in the art from the following description and claims.

The present disclosure is directed to a computer implemented method for biometric based signing of documents comprising:
receiving, on a user terminal, a signature request associated to a document from a requester;
displaying the document to the user on the user terminal;
requesting at least once a biometric identification of the user for creating at least one signing receipt;
associating the at least one signing receipt to the document;
transmitting the document and/or the signing receipt from the user terminal to the requester.

The present disclosure includes multiple aspects for biometric based signing of documents. The biometric based signing may make use of any biometric sample based on aspects of human physiology, chemistry or behaviour that show unique characteristics and as such can be used for biometric authentication. Non-limiting examples for characteristics to be used for biometric authentication may be fingerprint, palm veins, face recognition, DNA, palm print, hand geometry, iris recognition, retina and odour/scent but also behavioural characteristics such as typing rhythm, gait, and voice.

A document to be signed may be any kind of document that can be displayed on a terminal to a user who should sign the document. Non-limiting examples for documents to be signed are forms, acknowledgements of receipt, contracts or agreements, or any kind of electronic document, not limited to any file format. The document to be signed may be associated to convectional mail or email, e.g. an acknowledgement of receipt for confirming receipt of a delivery, but may also be an independent document.

A terminal may be any device capable of displaying a document to be signed making use of an internal or external display unit and of capturing information related to the characteristic(s) used making use of an internal or external detection unit. Non-limiting examples of terminal are devices such as smartphones, personal computers, tablet computers comprising detection means for the respective characteristic(s), such as cameras or scanning devices, microphones, and configured to execute a respective application, but also dedicated biometric scanning devices and combined devices consisting of detection and processing units. The terminal may comprise a processing unit configured to perform the respective steps of the method making use of the respective units or means of the terminal. The terminal may also comprise communication means and may also be connected to a network, such as the internet. The user terminal may also be associated to the requester of the signature, e.g. a delivery man, and presented to the user for biometric signing.

When the user receives, on a terminal a signature request associated to a document to be signed from a requester, the respective document is displayed on the display device of the terminal. In addition the user is prompted for biometric identification. The biometric identification constitutes the signing of the document and after successful biometric identification a signing receipt is created and automatically or manually associated to the document. The document may be presented to the user by any adequate presenting application, e.g. a text viewer or a web interface. The request for signing may be presented and processed by an application executed on the terminal or a plugin, an inFrame solution, a SDK or the like implemented on the presenting web site. The request for signing may be triggered by the signature request associated to the document when the document is opened in the presentation application. Alternatively, document presentation and signing processing may also be implement within a single dedicated application, e.g. a biometric signing application, executed on the terminal or a single plugin, a inFrame solution, a SDK or the like implemented on a web site. In these cases presentation and processing of the signing request may be processed by the same application.

Upon requesting the biometric identification, the adequate scanning means are initiated. For the scanning process, an individual application, e.g. a camera application of a smartphone may be started, or the scanning functionality may be implemented in the biometric signing application.

For the biometric identification, any biometric authentication methods known to the person skilled in the art may be used. In general, a biometric sample is captured and compared with a previously generated biometric template, containing key characteristics of the initial sample generated in advance during the enrolment process of the biometric authentication system. The biometric template used for biometric identification may be stored on the terminal or on any network device, such as a server accessible by the terminal. Alternatively, the captured sample may be associated to an unprocessed signature request for subsequent processing.

After successful processing the signature request, i.e. when the captured biometric sample matches with the stored template and therefore successful identification of the user, a signing receipt is created and associated to the document to be signed. In addition, the signature request may be marked electronically as processed, such that, when the document is re-opened, no further biometric identification is requested by the user. Furthermore, the document may be marked as signed and, in addition, a signature indication may be shown in connection with the document.

Followed by the creation of the signing receipt, the signed document, i.e. the document and the signing receipt is transmitted to the requester. Alternatively, only the signing receipt is transmitted to the requester. If the terminal is not associated to the user but to the requester or to any third party, the signing receipt may be provided to the user. This may be done electronically or in form of a printout. For transmission, any way of electronic communication may be possible, preferably secure communication channels are used.

In another aspect of the present disclosure, the signature request associated to the document to be signed includes preferences defining requirements for valid signing of the document. The preferences may define the type of biometric signing to be used. This may be based on biometric templates available due to a previous enrolment process and/or it may be based on the technical capabilities of the terminal. Also various biometric signing methods may be included for automatic selection or selection by the user.

The preferences may further include information regarding the minimum time the document or parts of the document need to be presented to the user before signing. In addition, presentation time values for certain parts of the document or a series of parts of the document may be defined in the preferences. Alternatively, additionally, the preferences may define at least one position where within the document it has to be signed. This may be a single position, e.g. at the end of the document, but also any other position within the document. It is also possible to include various signing positions, e.g. at the end of every page or paragraph of the document. It may also be possible to combine the presentation time with the signing position, e.g. define that at least one part of the document has to be presented to the user for a predefined period of time and than has to be signed by the user before reading and optional signing of the document can be continued.

In another aspect of the present disclosure, the preferences may further include requirements regarding the recognition of the content of the document by the user. Recognition of the content of the document by the user can be determined by different ways. Accordingly, the recognition may be determined based on the time needed by the user for reading the document or reading a part of the document which has to be signed individually. Making use of the minimum presentation time value in combination with data regarding the average time needed to read the document, signing could be prohibited if the user has not spent enough time to capture the content.

Alternatively or in addition, the recognition of the content may be determined based on the eye movement of the user. As the user reading a document to be signed in the display of the device, tracking the eye movement with respect to the position of the content presented on the terminal provides an indication whether the eyes of the user have scanned every part of the document. For the purpose of eye movement determination, a camera integrated into the terminal, e.g. the front camera of a smartphone, may be used.

In another aspect of the present disclosure, the preferences may further include requirements regarding the attention of the user when reading the document. Attention of the user may be determined on the position of the face with respect to the display of the terminal, i.e. whether the user directs and has directed his view to the terminal or whether the user looks somewhere else. Alternatively or in addition, the attention of the user may be determined on the basis of the mimic of the user, e.g. whether the facial expression is concentrated or distracted.

In another aspect of the present disclosure, the biometric identification may be based on an iris scan of an eye or the eyes of the user. In case where the recognition of the content of the document is based on the eye tracking as described previously, this could be combined with the biometric identification. Accordingly, the user reading the document is automatically identified when starting to read the document. During the reading process, it may be possible to monitor that it is still the same user who reads the document by repeated biometric authentication. In addition, the on-going iris scan may be used to automatically sing the document at the required position(s)—preconditioned that the other requirements set out in the preferences—if any—are fulfilled. Alternatively, the on-going identification may also by implemented without recognition determination.

In yet another aspect of the present disclosure, the biometric identification may be based on face recognition. The face recognition may also be performed continuously during the reading process. According to this, biometric identification for signing the document may be performed automatically at the required position(s) when the user is reading the documents—preconditioned that the other requirements set out in the preferences—if any—are fulfilled. Alternatively, the on-going identification may also be implemented without recognition determination.

In yet a further aspect of the present disclosure, the biometric identification is performed automatically at predetermined time intervals or at predefined position within the document or any other condition set out in the preferences. Depending on the biometric identification method and/or the capabilities of the terminal the identification may be performed automatically and without any interaction needed by the user or it may automatically prompt the user to perform the biometric identification based on the present conditions.

In another aspect of the present invention the preferences include additional information to be overlaid to or introduced into the content of the document to be read and signed by the user. The information may be displayed to the user as predefined position or at predefined time intervals. The predefined position or the predefined time intervals may be set out in the preferences. The additional information may be any kind of information and may be used to assist the user to focus on the content of the document or to assist memorization of the content. Accordingly, the additional information may include instructions to the user to rest his eyes or relax for a certain period of time. In addition or alternatively, the additional information may provide personal details of the user somehow related to the content of the document in order to support memorization. Alternatively, or additionally, general information or anecdotes related to the content of the document may be presented to the user in order to support memorization. The additional information may be content dependent, and also present at specific parts of the document depending on the content of the part of the document. Eye tracking may be applied in order to determine the current reading position of the user.

The present disclosure is also directed to a computer program computer program product comprising program instructions for carrying out each of the method steps of the disclosure, when said product is executed on a computer.

Furthermore, the present disclosure is directed to a computer readable medium storing program instructions, which, when executed by a processor of a computer cause the computer to perform each of the method steps of the disclosure.

One advantage that may be realized in the practice of some embodiments of the described methods is that raw data of biometric samples can electronically be stored securely and may be consolidated and rebuilt for verification of doubtful biometric authentication processes. Other technical advantages of the present disclosure will be readily apparent to one skilled in the art from the following description of preferred embodiments and the claims. Various embodiments of the present application obtain only a subset of the advantages set forth. No single advantage is critical to the embodiments. Any claimed embodiment may be technically combined with any other claimed embodiments.

Figure 1:
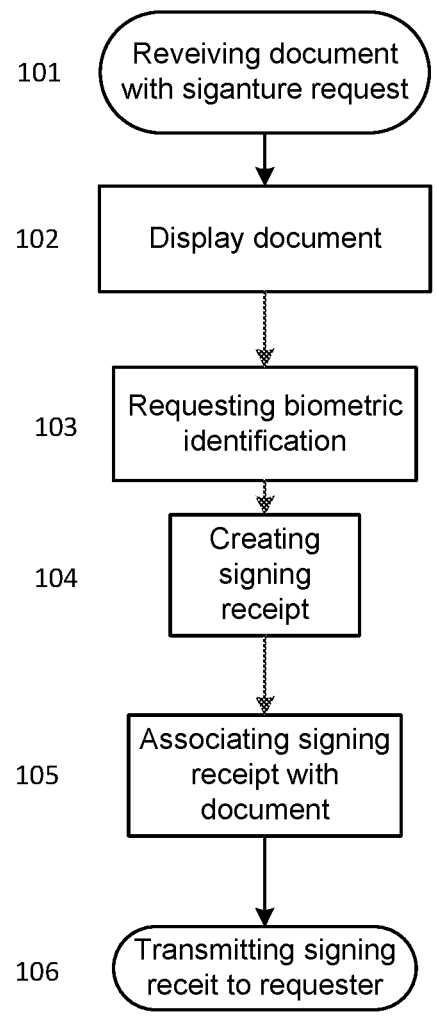
FIG. 1 shows a flowchart of the biometric based signing process.

The accompanying drawings illustrate exemplary embodiments of the disclosure and serve to explain, by way of example, the principles of the disclosure.

DETAILED DESCRIPTION

The present disclosure will now be described more fully hereinafter with reference to the accompanying figures, in which preferred embodiments are shown. The method, however, may be embodied in many different forms and should not be construed as limited to the embodiments set forth herein. It should be noted that these figures are intended to illustrate the general characteristics of the methods utilized in certain embodiments. However, the figures may not precisely reflect the precise structure or performance characteristic of any given embodiment. Moreover, in the figures like reference numerals designate corresponding parts throughout the different views or embodiments.

FIG. 1 is a flowchart illustrating exemplary the overall steps for biometric based signing method for electronic documents. In step 101 the user receives, at a terminal such as a smartphone, an electronic document with an associated signature request. At step 102, the electronic document is presented to the user on the display of the terminal. Triggered by the signature request associated to the electronic document, a request for biometric authentication is presented to the user. The kind of biometric authentication is based on preferences, e.g. based on the method selected during the enrolment process for biometric authentication and/or may be adapted to the capabilities of the terminal. Request for biometric authentication may also be handled automatically and as a background application invisible to the user, such that the biometric authentication process is processed automatically without any user interaction. Alternatively, if the authentication is not processed automatically, the user is prompted to perform the necessary steps, i.e. to capture the biometric sample based on the biometric method used, e.g. to scan a fingerprint or to capture an image of the face or the iris of the user.

After the biometric authentication as been processed and the captured biometric sample matches with the biometric template created during the enrolment process, at step 104 a signing receipt is created and, at step 105, associated with the document to be signed.

At step 106 the signing receipt, either alone or together with the signed document, is transmitted to the requester.

Figure 2:
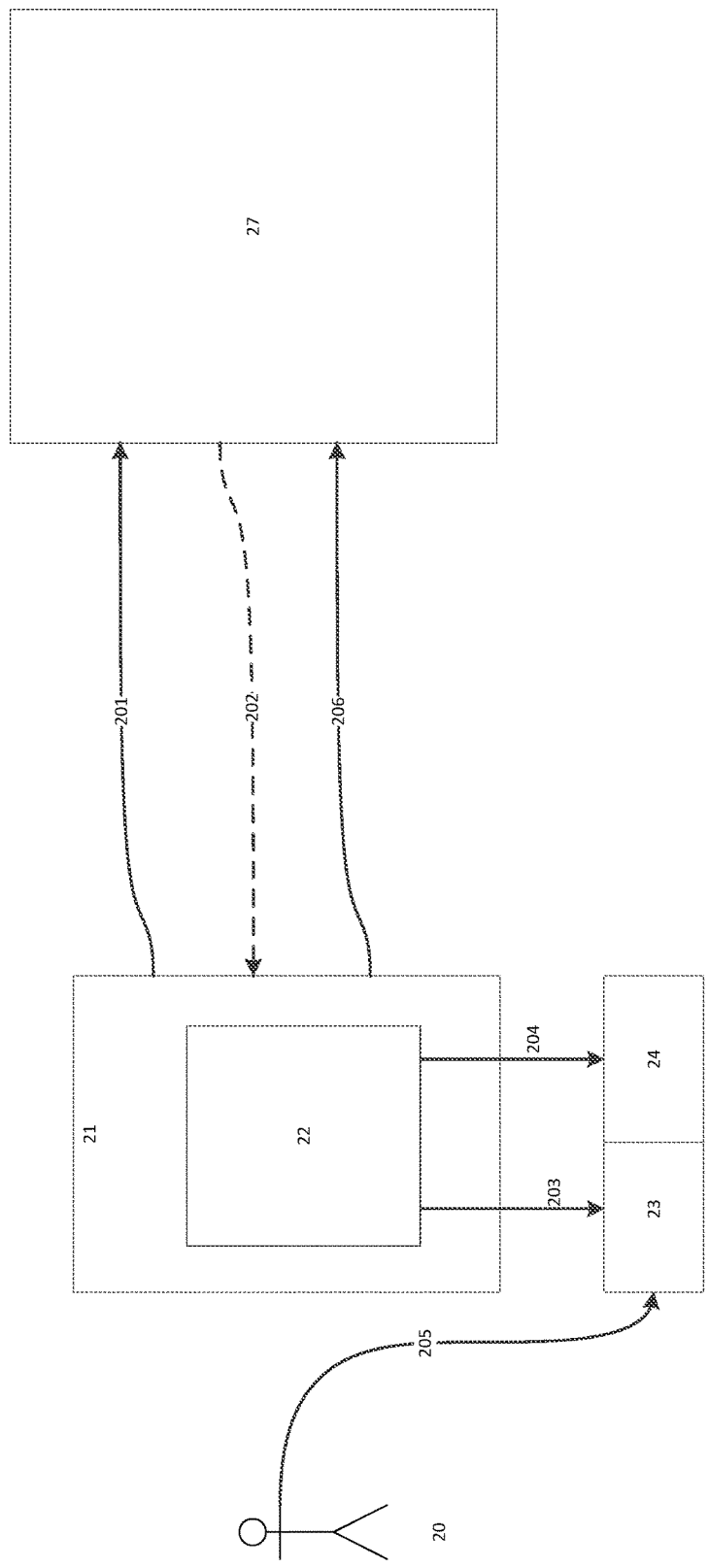
FIG. 2 is block diagram showing the entities involved in combination with the steps of the enrolment process for the biometric authentication method.

FIG. 2 is a block diagram showing the entities involved in combination with the steps of the enrolment process needed for subsequent use of the biometric based signing method. In the beginning the user 20 starts a biometric signing application 22 executed on a terminal 21 associated to the user, e.g. a smartphone and starts the enrolments process to enable the use of the biometric based signing method. At the beginning of the enrolment process, the biometric signing application 22 initiates at step 201 a communication channel with an authentication platform 27. Responsive to the initiation of the communication channel at step 201, the authentication platform transmits at step 202 a biometric sample capture request to the biometric signing application 22 executed on the terminal 21. Depending in the biometric sample capture request and on the capabilities of the terminal 21, the biometric signing application 22 initiates at step 203 a fingerprint scanner 23 and/or at step 204 a camera system 24 for face and/or iris recognition and prompts the user 20 to assist to capture the respective biometric sample. After the biometric sample(s) have been captured at step 205, the data is processed by the biometric signing application 22 and the generated biometric template(s) is/are transmitted at step 206 to the authentication platform 27.

Figure 3:
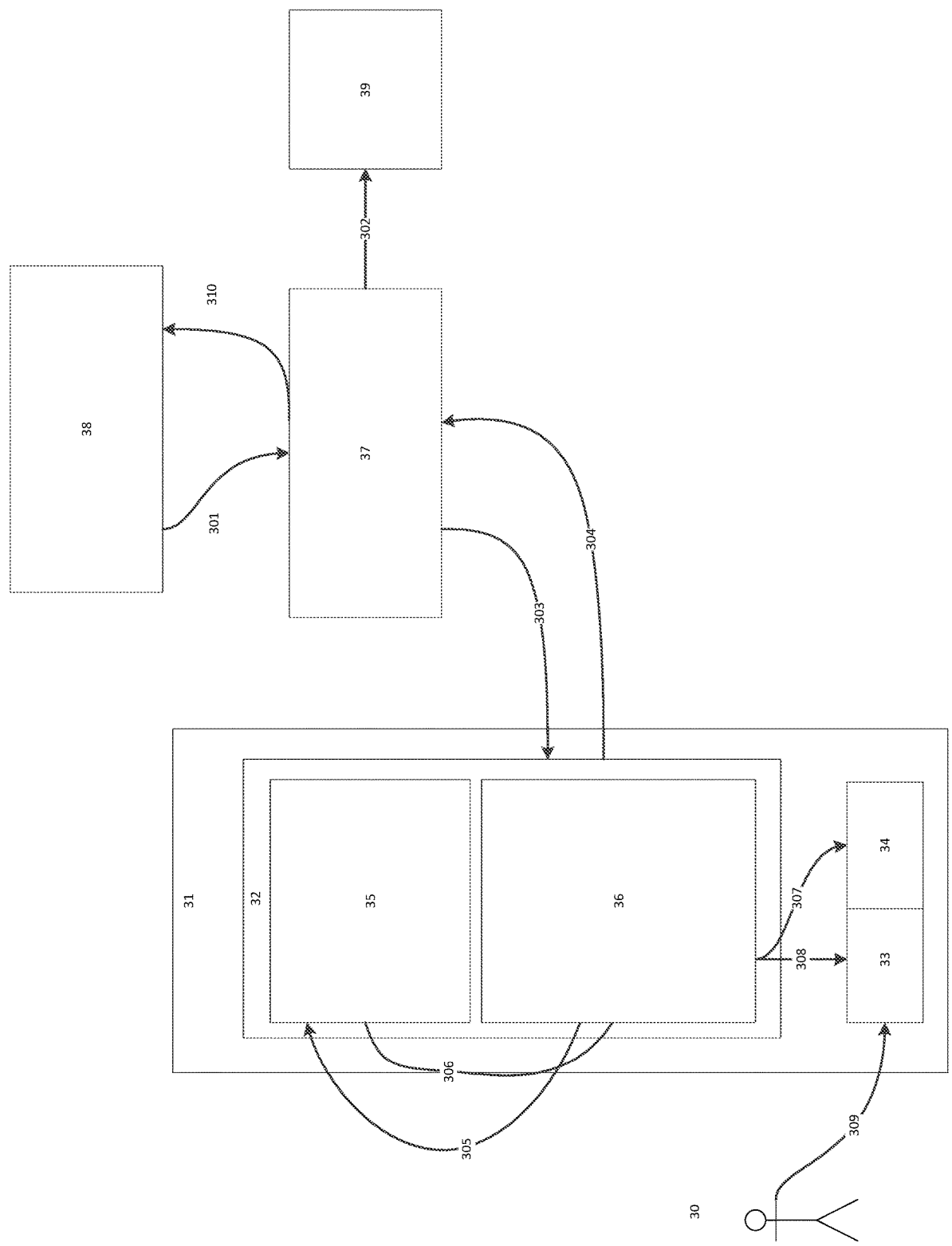
FIG. 3 is a block diagram showing the entities involved in combination with the steps of the biometric based signing process.

FIG. 3 is a block diagram showing the entities involved in combination with the steps of the biometric based signing of electronic documents after successful enrolment for the biometric authentication. In the beginning, a user 30 receives at a biometric signing application 32 executed on a terminal 31 associated to the user, e.g. a smartphone, a document together with a signature request from a requester 38. The document is sent from the requester 38 to the user 30 through an authentication platform 37 which supplements the initial signature request from the requester 38 with biometric authentication rules based on the previous enrolment process. Accordingly, the requester 38 transmits at step 301 a document to be signed together with a signature request to the authentication platform 37. The authentication platform 37 accesses at step 302 an authentication rule database 39 to get the user specific authentication information in step 302, e.g. the possible authentication methods and the corresponding template information, for addition to the signing request. The authentication platform 37 then transmits at step 303 the document to be signed together with the completed signature request to the terminal 31 of the user 30. Responsive to receiving the document together with the signature request, the biometric signing application 32 is started. The biometric signing application 32 presents at step 305 the document to the user 30 via a content viewer 35 and, triggered by the signature request, initiates at step 306 an authentication agent 36.

The authentication agent 36, at communicates at step 308 with a fingerprint scanner 33 and/or at step 307 with a camera system 34 for face and/or iris recognition and prompts the user 30 to assist to capture the respective biometric sample. After the biometric sample(s) have been captured at step 309, the data is processed by the biometric signing application 32 and validates the biometric authentication. This process may either be performed by the authentication agent 36 on the terminal 31 or in interaction with the authentication platform 37. Subsequently a signing receipt is created and associated to the document to be signed.

At step 304 the signing receipt associated to the document is transmitted to the authentication platform 37 and either the signing receipt or a signing confirmation created at the authentication platform 37 is transmitted at step 310 to the requester 38 to confirm that the document as successfully been signed by the user 30.

Figure 4:
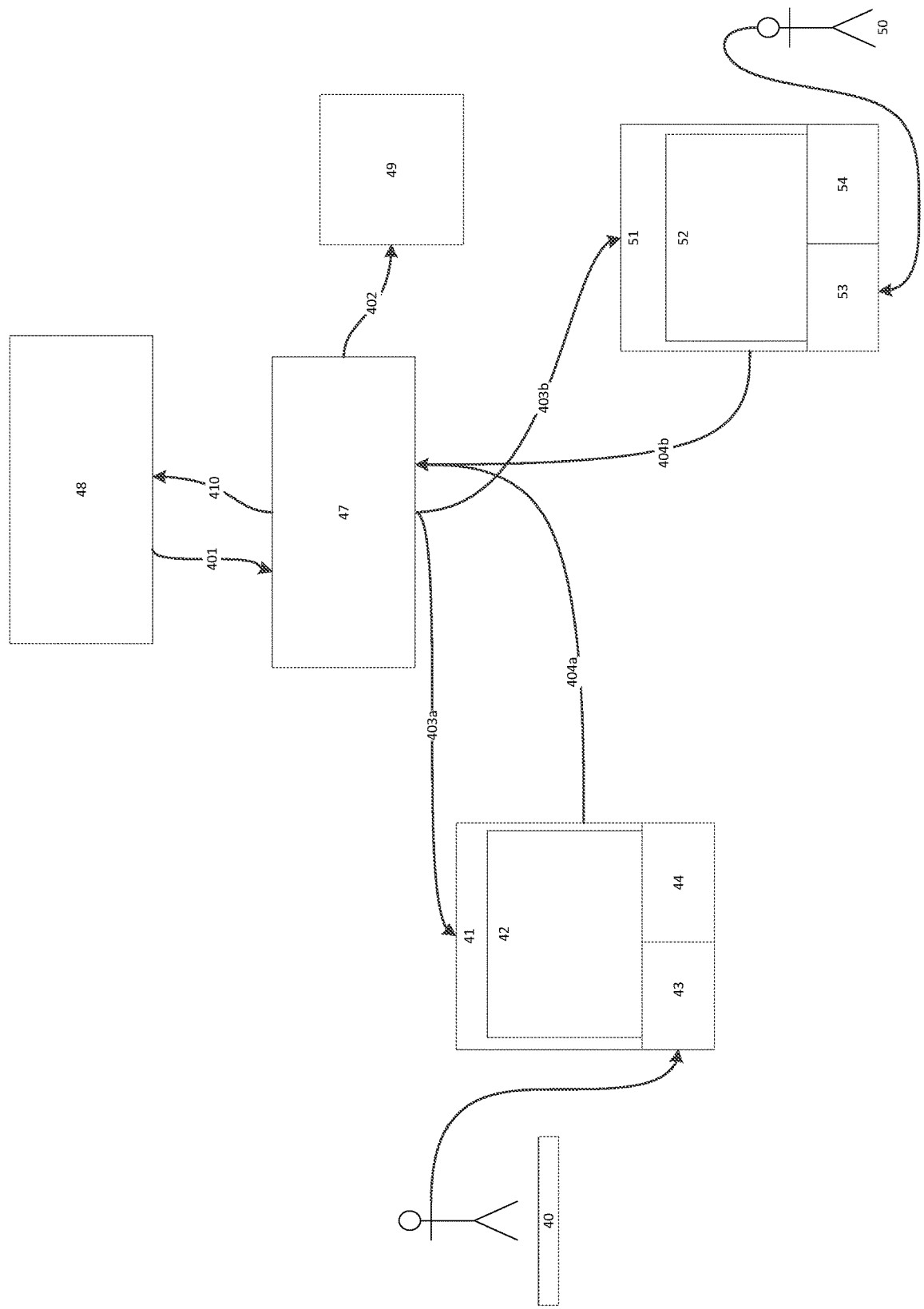
FIG. 4 is a block diagram showing the entities involved in combination with the steps of the biometric based signing process in a multiuser environment.

FIG. 4 is a block diagram showing the entities involved in combination with the steps of the biometric based signing of electronic documents after successful enrolment for the biometric authentication in a multiuser environment. The process is very similar to the one shown and described in FIG. 3. In the beginning a requester 48 sends a document to be signed by a first user 40 and by a second user 50 together with a respective signature request to an authentication platform 47. The authentication platform which supplements the initial singing request from the requester 48 with biometric authentication rules based on the previous enrolment process. Accordingly, the requester 48 transmits at step 401 a document to be signed together with a signature request to the authentication platform 47. The authentication platform 47 accesses at step 402 an authentication rule database 49 to get the user 40, 50 specific authentication information in step 402, e.g. the possible authentication methods and the corresponding template information, for addition to the signing request. The authentication platform then transmits at steps 403a and 403b the document to be signed together with the completed signature request to the terminals 41, 51 of the users 40, 50. Responsive to receiving the document together with the signing request, the biometric signing applications 42, 52 are started. The biometric signing applications 42, 53 present the document to the users 40, 50 via content viewers being part of the biometric signing applications 42, 52 and, triggered by the signature requests, initiate authentication agents, which are part of the biometric signing applications 42, 52. The authentication agents activate and communicate with fingerprint scanners 43, 53 and/or with camera systems 44, 54 for face and/or iris recognition and prompt the users 40, 50 to assist to capture the respective biometric samples. After the biometric sample(s) have been captured, the data is processed by the biometric signing applications 42, 52 and signing receipts are created and associated to the document to be signed.

At steps 404a, 404b the signing receipts associated to the document are transmitted to the authentication platform 47 and either the signing receipt or a singing confirmation created at the authentication platform 47 is transmitted at step 410 to the requester 48 to confirm that the document as successfully been signed by the users 40, 50.

This description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art.

The invention claimed is:

1. A method for biometric based signing of documents comprising:

receiving, by a user terminal via an authentication platform from a requestor, a signature request associated to a document, the signature request comprising preferences defining a combination of at least one portion of the document to present for a minimum document presentation time and at least two signing positions, and further comprising a type of biometric signing required for valid signing of the document;

displaying, by the user terminal on a display, a first portion of the document to a user for the minimum document presentation time;

presenting, by the user terminal on the display, a request for the type of biometric signing based on the preferences to associate with the first portion of the document;

matching, by the user terminal in response to the request for the type of biometric signing, biometric samples provided by the user to a biometric template created during an enrollment process;

repeating, by the user terminal, the displaying, presenting and matching steps for at least a second signing position based on the preferences;

determining, by the user terminal, that the preferences associated with the biometric signature requests have been satisfied;

creating, by the user terminal, at least one signing receipt;

associating, by the user terminal, the at least one signing receipt to the document; and transmitting, by the user terminal via the authentication platform to the requestor, at least one of the document and the signing receipt confirming successful signing of the document.

2. The method according to claim 1, wherein the preferences further comprise recognition of the content of the document by the user.

3. The method according to claim 2, wherein content recognition is determined by detecting the eye movement of the user.

4. The method according to claim 1, wherein the preferences further comprise evaluation of the attention of the user reading the document.

5. The method according to claim 4, wherein the attention of the user is evaluated based on changes in facial expression of the user.

6. The method according to claim 1, wherein identification of the user is done automatically at the positions or time intervals as defined in the preferences.

7. The method according to claim 1, wherein the preferences include additional information to be overlaid with the document interacting with the user.

8. The method according to claim 7, wherein the additional information relates to user specific data.

9. The method according to claim 8, wherein the additional information links content of the document with the user specific data to support memorization of the content.

10. A terminal for performing a method for biometric based signing of a document, the terminal comprising:
   a display unit;
   a capturing unit operably connected to the display unit for capturing information related to a characteristic used for biometric signing; and
   a processing unit operably connected to the display unit and to the capturing unit and configured to:
      receive, via an authentication platform from a requestor, a signature request associated to a document, the signature request comprising preferences defining a combination of at least one portion of the document to present for a minimum document presentation time and at least two signing positions, and further comprising a type of biometric signing required for valid signing of the document;
      display, on the display unit, a first portion of the document to a user for the minimum document presentation time;
      present a signature request on the display unit, the signature request for the type of biometric signing based on the preferences to associate with the first portion of the document;
      match in response to the request for the type of biometric signing, biometric samples provided by the user in response to the signature request to a biometric template created during an enrollment process;
      repeat the displaying, presenting and matching steps for at least a second signing position based on the preferences;
      determine that the preferences associated with the biometric signature requests have been satisfied;
      create at least one signing receipt;
      associate the at least one singing receipt to the document; and
      transmit at least one of the document and the signing receipt to the requestor confirming successful signing of the document.

11. The terminal of claim 10, further comprising a communication unit.

12. A non-transitory computer-readable medium storing program instructions executable by a processor of a user device which when executed cause the processor to perform biometric based signing of documents, the method comprising:
   receiving, by a user terminal via an authentication platform from a requestor, a signature request associated to a document, the signature request comprising preferences defining a combination of at least one portion of the document to present for a minimum document presentation time and at least two signing positions, and further comprising a type of biometric signing required for valid signing of the document;
   displaying, by the user terminal on a display, a first portion of the document to a user for the minimum document presentation time;
   presenting, by the user terminal on the display, a request for the type of biometric signing based on the preferences to associate with the first portion of the document;
   matching, by the user terminal in response to the request for the type of biometric signing, biometric samples provided by the user to a biometric template created during an enrollment process;
   repeating, by the user terminal, the displaying, presenting and matching steps for at least a second signing position based on the preferences;
   determining, by the user terminal, that the preferences associated with the biometric signature requests have been satisfied;
   creating, by the user terminal, at least one signing receipt;
   associating, by the user terminal, the at least one signing receipt to the document; and
   transmitting, by the user terminal via the authentication platform to the requestor, at least one of the document and the signing receipt confirming successful signing of the document.

* * * * *